(12) United States Patent  
Alapuranen et al.

(10) Patent No.: US 8,942,247 B1  
(45) Date of Patent: Jan. 27, 2015

(54) SYSTEM FOR AUTOMATIC REGISTRATION OF EXPEDITIONARY TELECOMMUNICATIONS DEPLOYMENTS

(71) Applicant: XG Technology, Inc., Sarasota, FL (US)

(72) Inventors: Pertti Alapuranen, Deltona, FL (US); Michael Johnson, Orlando, FL (US)

(73) Assignee: XG Technology, Inc., Sarasota, FL (US)

( * ) Notice: Subject to any disclaimer, the term of this patent is extended or adjusted under 35 U.S.C. 154(b) by 2 days.

(21) Appl. No.: 13/959,930

(22) Filed: Aug. 6, 2013

(51) Int. Cl.
*H04L 12/28* (2006.01)
*H04W 60/00* (2009.01)
*H04W 8/26* (2009.01)

(52) U.S. Cl.
CPC ............ H04W 60/00 (2013.01); H04W 8/265 (2013.01)
USPC .......................... 370/401; 370/325; 455/435.1

(58) Field of Classification Search
USPC ............ 455/435.1; 370/401, 325; 379/201.01
See application file for complete search history.

(56) References Cited

U.S. PATENT DOCUMENTS

| | | | |
|---|---|---|---|
| 2002/0110231 A1* | 8/2002 | O'Neal et al. | 379/201.01 |
| 2006/0136567 A1* | 6/2006 | Muramatsu et al. | 709/217 |
| 2007/0147399 A1* | 6/2007 | Deng et al. | 370/401 |
| 2009/0234876 A1* | 9/2009 | Schigel et al. | 707/102 |

* cited by examiner

*Primary Examiner* — David Q Nguyen
(74) *Attorney, Agent, or Firm* — Dennis L. Cook, Esq.

(57) ABSTRACT

A system and method for enabling voice and broadband data delivery to users in expeditionary deployments is disclosed. More specifically the system is composed of a registration server, a wireless telco network server, a wide area transport network, and an external network interconnect (like satellite or fiber location) such that when users arrive at a disaster scene where communications infrastructure has been destroyed or is unavailable, they are either handed a smart device (smartphone, laptop, tablet, etc.) or they utilize an existing smart device they brought with them (BYOD) and via the Wi-Fi interface they connect to the wide area transport network.

3 Claims, 2 Drawing Sheets

SYSTEM FOR AUTOMATIC REGISTRATION OF EXPEDITIONARY TELECOMMUNICATIONS DEPLOYMENTS

CROSS-REFERENCE TO RELATED APPLICATION

The present application claims the benefit of previously filed Provisional Patent Application, Ser. No. 61/679,902 filed Aug. 6, 2012.

FIELD OF THE INVENTION

This disclosure describes a system and method for enabling voice and broadband data delivery to users in expeditionary deployments. More specifically the system is composed of a registration server, a wireless telco network server, a wide area transport network, and an external network interconnect (like satellite or fiber location) such that when users arrive at a disaster scene where communications infrastructure has been destroyed or is unavailable, they are either handed a smart device (smartphone, laptop, tablet, etc.) or they utilize an existing smart device they brought with them (BYOD) and via a Wi-Fi interface they connect to the wide area transport network.

BACKGROUND OF THE INVENTION

This disclosure describes a system and method for enabling voice and broadband data delivery to users in expeditionary deployments. A main problem with these "disaster" deployments is authentication, identification, and registration of users at the disaster site. Typically phone systems are down so normal voice and text numbers are inoperative. The system described herein addresses these problems and can be used for, but not limited to, disaster locations, deployment of combat troops in battle locations, and Greenfield telecommunications deployments in harsh locations.

BRIEF SUMMARY OF THE INVENTION

This disclosure describes a system and method for enabling voice and broadband data delivery to users in expeditionary deployments. More specifically the system is composed of a registration server, a wireless telco network server, a wide area transport network, and an external network interconnect (like satellite or fiber location). When users arrive at a disaster scene where communications infrastructure has been destroyed or is unavailable, they are either handed a smart device (smartphone, laptop, tablet, etc.) or they utilize an existing smart device they brought with them (BYOD). Via the Wi-Fi interface they can connect to the wide area transport network.

For a fuller understanding of the nature and objects of the invention, reference should be made to the following detailed description taken in connection with the accompanying drawing.

DESCRIPTION OF THE DRAWINGS

For a fuller understanding of the nature and objects of the invention, reference should be made to the accompanying drawing, in which.

DETAILED DESCRIPTION OF THE INVENTION

Figure 1:
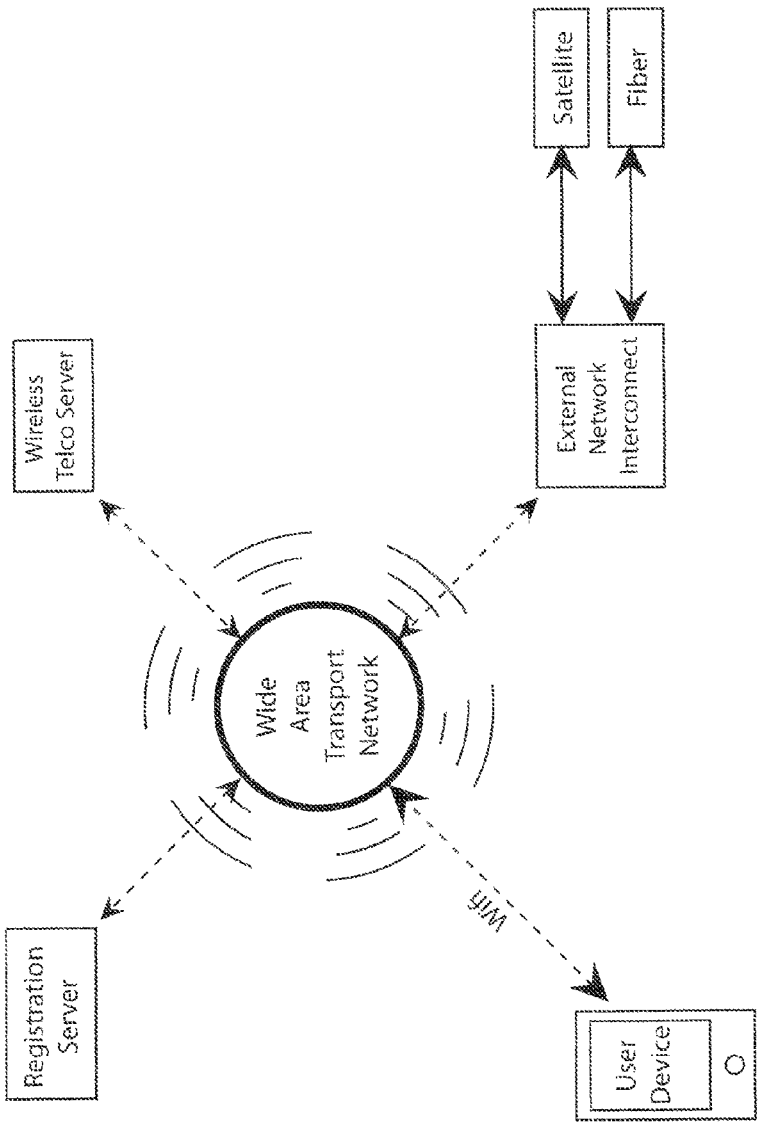
FIG. 1 is a diagram showing a block diagram of the system.

The system is composed of a registration server, a wireless telco network server, a wide area transport network, and an external network interconnect (like satellite or fiber location) as shown in FIG. 1. When users arrive at a disaster scene where communications infrastructure has been destroyed or is unavailable, they are either handed a smart device (smartphone, laptop, tablet, etc.) or they utilize an existing smart device they brought with them (BYOD). Via the WiFi interface they connect to the wide area transport network. Once connected they are driven to a web page that allows them to enter information and get instantly provisioned. Once a user has provided credentials through the web page the system allows a user to fill in relevant information so that a phone book or dictionary entry can be constructed. The dictionary is periodically updated and allows users of the system to see who and what roles are available in the dynamic phone book or dictionary.

Therefore it is an object of this invention to provide a system and method to verify user credentials (password) and to fill role based information for a dynamic phone book or dictionary that is automatically loaded to smart phone applications allowing provisioning of users in a disaster scenario without preplanned phone books.

It is a further object of this invention to provide a system and method to verify information and to automatically group information on a dynamic phone book based on roles, i.e. user can choose to call a doctor, all doctors, etc., instead of using a phone number. The application translates roles to phone numbers based on the dynamic phone book It is an additional object of this invention to provide a system and method to automatically associate public network phone numbers with locally given emergency network dynamic phone numbers such as a call from PSTN being translated to a local dynamically assigned phone number that is valid only in the local scenario and wherein after the person has exited the network the association is removed.

And finally, it is also an object of this invention to provide a system and method to load credentials needed for VOIP calls through a data link that is authenticated using a web browser. When a user enters a valid password for a local network the password allows VOIP credentials to be automatically loaded to a VOIP application in the same smart device, i.e. a smartphone.

Figure 2:
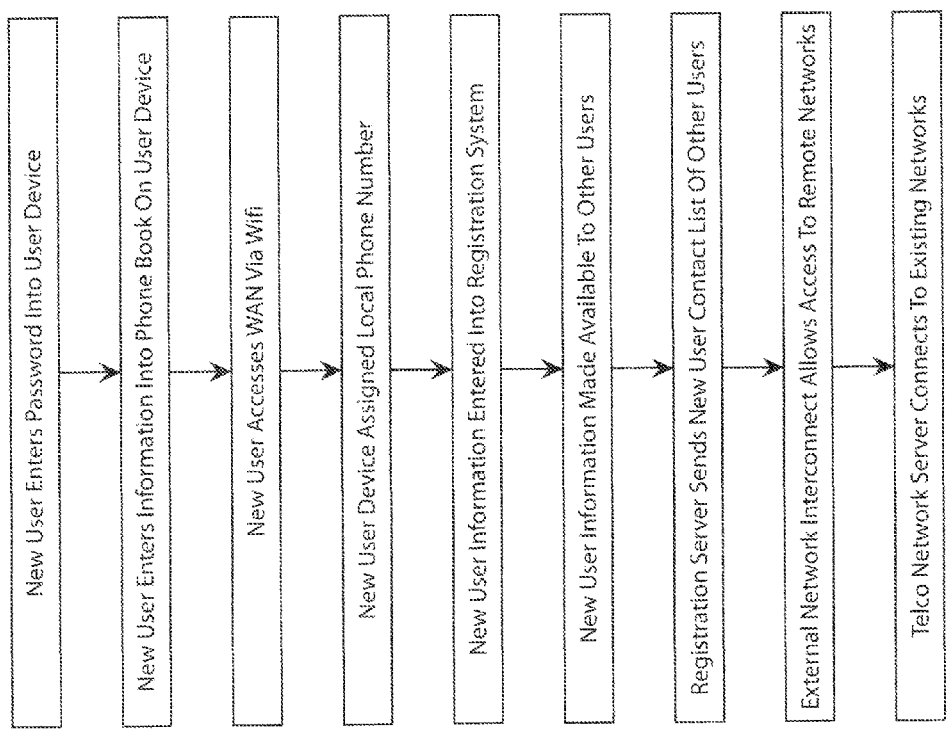
FIG. 2 is a flow diagram showing the method of the system.

In one preferred embodiment method as shown in FIG. 2 the credentials might be just a network password that allows access to fill in more information or allows information to be filled into the dynamic phone book. The information entered can include, but is not limited to, user name, user personal phone number, user division, reason user is there, user role classification (doctor, paramedic, security, firefighter, etc.). Once the network password is validated, the smart device is allowed to access the wide area network and is assigned a local phone number. The user information is entered into the registration server and made available to one or all of the participants in the expeditionary exercise. The new user receives an updated contact list, dynamic phone book, on the smart device along with an application that is able to search the dynamic phone book by multiple fields (in one embodiment, name, function, location).

The updated contact list (dynamic phone book entries) is automatically downloaded to the smart devices periodically, or when the contact list is updated. The external network connection allows the network users to access remote networks via a connection like satellite. The telco network server interconnects to the existing networks (like ATT or Verizon) and automatically forwards the personal number to the newly assigned "expeditionary" number allowing the user the ability to receive phone calls or text messages directed to the user's personal number while remaining in the expeditionary location.

Since certain changes may be made in the above described system and method for an automatic registration of expeditionary telecommunications deployments without departing from the scope of the invention herein involved, it is intended that all matter contained in the description thereof or shown in the accompanying figures shall be interpreted as illustrative and not in a limiting sense.

What is claimed is:

1. A system to set up a wide area transport network to supply voice and broadband data delivery to users in an area not having typical phone service comprising:
    a registration server;
    a telecom server;
    an external network interconnect;
    a user device;
    wherein a new user enters credentials and user information into said user device;
    said user device accesses said registration server via a wireless connection;
    said new user is assigned a new wide area transport network local telephone number by said registration server;
    said new user credentials are verified and said new user information is stored in said registration server;
    said new user information is sent by said registration server to other users via said wide area transport network and stored in a dynamic phone book containing all users' assigned wide area transport network local telephone numbers on said other users' device;
    said registration server sends other users' information to said new user via said wide area transport network such that new user and other users can find and contact each other through said wide are transport network local telephone numbers found on said dynamic phone book;
    said registration server periodically sending user information via said wide area transport network to new and other users dynamic phone book; and,
    said external network interconnect connecting said wide area transport network to external existing networks.

2. The system of claim 1 wherein said registration server further automatically groups information entered by said new and other users in said new and other users devices' dynamic phone book based on roles wherein said new and other users can choose one of a group or a whole group instead of using a wide area transport network local telephone number.

3. The system of claim 1 wherein said registration server automatically associates public network phone numbers to assigned wide area transport network local telephone numbers such that a call from a PSTN is translated to an assigned wide area transport network local telephone number that is valid only in the wide area transport network and wherein after said new or other user has exited the wide area transport network the association is removed.

* * * * *